(12) United States Patent
Prokofiev et al.

(10) Patent No.: US 6,422,076 B1
(45) Date of Patent: Jul. 23, 2002

(54) COMPENSATION PENDULOUS ACCELEROMETER

(75) Inventors: Viktor Mikhailovich Prokofiev; Alexandr Sergeevich Larshin; Valery Ivanovich Kurnosov; Alexandr Afanasievich Konovchenko; Anufry Rafailovich Bakhratov; Sergei Feodosievich Konovalov, Kholzunov pereulok, d. 6, kv. 24; Alexei Viktorovich Polynkov; Alexandr Alexandrovich Trunov, all of Moscow (RU); Moon-Su Oh, Taejeon (KR); Tae-Ho Chung, Taejeon (KR); Hong-Key Moon, Taejeon (KR); Jae-Beom Seo, Taejeon (KR); Oh-Sun Kwon, Taejeon (KR)

(73) Assignees: Agency For Defense Development, Taejon (KR); Sergei Feodosievich Konovalov, Moscow (RU)

( * ) Notice: Subject to any disclaimer, the term of this patent is extended or adjusted under 35 U.S.C. 154(b) by 7 days.

(21) Appl. No.: 09/598,386

(22) Filed: Jun. 21, 2000

(30) Foreign Application Priority Data

Jun. 23, 1999 (RU) .............................................. 99113694

(51) Int. Cl.$^7$ ............................. G01P 15/08; G01P 15/13
(52) U.S. Cl. ................................. 73/514.23; 73/514.38
(58) Field of Search ......................... 73/514.21, 514.22, 73/514.23, 514.24, 514.38

(56) References Cited

U.S. PATENT DOCUMENTS

| | | | | |
|---|---|---|---|---|
| 3,680,393 A | * | 8/1972 | Rogall ..................... | 73/514.23 |
| 3,702,073 A | | 11/1972 | Jacobs ........................ | 73/517 |
| 4,658,647 A | * | 4/1987 | Shintani et al. .......... | 73/514.23 |
| 4,854,169 A | * | 8/1989 | Sakuma et al. .......... | 73/514.23 |

* cited by examiner

Primary Examiner—Helen Kwok
(74) Attorney, Agent, or Firm—Burns, Doane, Swecker & Mathis, L.L.P.

(57) ABSTRACT

A compensation pendulous accelerometer comprises a body in which a pendulous unit is positioned that is made as a unitary plate of a silicon monocrystal and comprises a movable vane on a flexible suspension and a support frame with protrusions. Two magnetic systems are secured on opposite sides of the movable vane and two coils of a torquer are positioned in a clearance of a corresponding core and are secured on a corresponding side of the movable vane. The flexible suspension includes flexible members arranged at an angle of 90 degrees relative to one another, symmetrically relative to an axis of symmetry of the pendulous unit. When the accelerometer is accelerated, the movable vane deflects in the opposite direction of the acceleration, and a current in the coils returns the movable vane to its initial position. A measured amount of current through coils is used to determine the acceleration.

11 Claims, 4 Drawing Sheets

COMPENSATION PENDULOUS ACCELEROMETER

FIELD OF THE INVENTION

The present invention relates to instruments for measuring acceleration, more exactly to compensation accelerometers in which a movable sensitive member that reacts to acceleration is held in a neutral position by a negative feedback system.

BACKGROUND OF THE INVENTION

An accelerometer is known from prior art (see, e.g., U.S. Pat. No. 3,702,073), which comprises a body with a sensitive member arranged therein and with two magnetic systems of a magnetoelectric torquer. The pendulous unit of the accelerometer is made of a single plate of melted quartz and comprises a movable portion made in the form of a vane and connected to a supporting flame that is stationary, by means of two flexible tapered plane-parallel connectors. Each side of the vane has a metal coating, forming a capacitor with the inner surface of the magnetic system on each side of the vane. The clearance of a capacitance pick-off (it is also the clearance of a gas damper) is farmed by means of three protrusions of equal height which are made on the two sides of the supporting frame.

It is known that the use of monocrystalline silicon, without impairing the accuracy of measurement of the characteristics of an accelerometer, provides a substantial technological advantage, reducing the labor input, and consequently, the cost of the accelerometer.

The main drawback of the accelerometer under consideration is that it is not possible to use therein monocrystalline silicon instead of melted quartz as the material of the pendulous unit. However, it is not possible to use a silicon pendulous unit in this construction, since silicon is not an insulator and requires oxidation in order to create an insulation layer. Since it is not possible to achieve a substantial thickness of the insulation layer by oxidation, there will be large capacitances between the electrodes made on the oxidated surface of the silicon and the body of the pendulous unit, these capacitances shunting the working capacitances of the pick off and not making it possible to ensure the normal functioning of the accelerometer.

The instrument disclosed in USSR Inventor's Certificate No. 1679395 is the analog most similar to the proposed accelerometer.

This accelerometer also comprises a body, a sensitive member and two magnetic systems of a magnetoelectric torquer. The pendulous unit has a vane, a support frame with protrusions and two flexible plane-parallel connectors. All of these elements are made of a unitary plate of monocrystalline silicon.

The vane of the pendulous unit is a movable electrode of a differential pick off, while the stationary electrodes are made on intermediate insulating rings. The intermediate insulating rings are arranged between the pendulous unit and the face surfaces of the magnetic systems of the magnetoelectric torquer.

This construction makes it possible to use a silicon pendulous unit.

However, the arrangement of the insulating rings between the pendulous unit and the magnetic systems of the torquer leads to an increase in the dimensions of the accelerometer in the direction of its axis of sensitivity, and also to a reduction of its reliability because of the necessity of removing coils secured on the vane to substantial distances from the center of gravity of the pendulum.

Furthermore, the traditional arrangement of the flexures in the pendulous unit does not make it possible to reduce the dimensions of the accelerometer in the direction perpendicular to the axis of sensitivity of the accelerometer.

Means for protection against impact action are not provided in the directions perpendicular to the axis of sensitivity of the accelerometer.

SUMMARY OF THE INVENTION

The object at the base of the instant invention is the creation of a compensation pendulous accelerometer which has increased accuracy of the measurement of an acceleration vector, while maintaining or reducing the size and enhancing the vibration resistance.

The stated object is achieved in a compensation pendulous accelerometer comprising a body in which a pendulous unit is positioned that is made of a unitary plate of a silicon monocrystal and comprises a movable vane on a flexible suspension and a support frame with protrusions on both sides of the support frame for positioning, two electrical insulation means which are secured on the two sides oil the support frame on the protrusions, and two magnetic systems, each of which comprises a core, a permanent magnet and a pole piece, and is secured on a corresponding electrical insulation means, two coils of a torquer with leads, each coil of which is positioned in a clearance of a corresponding core and is secured on a corresponding side of the movable vane, in that in accordance with the invention, the flexible suspension comprises at least two flexible members arranged at an angle of 90 degrees relative to one another symmetrically relative to an axis of symmetry of the pendulous unit, wherein each electrical insulation means is made in the form of a bush that encompasses the core of a magnetic system along the outer side surface, and the support frame of the pendulous unit with its protrusions positioned on both sides abuts against the faces of the bushes, forming common planes with core faces facing the pendulous unit, wherein the accelerometer additionally comprises a means for fixing the magnetic systems relative to the pendulous unit, this means being placed on the pendulous unit and each electrical insulation means.

It is advisable that the accelerometer comprises a mounting means secured in the body and serving to fix the pendulous unit relative to the body, wherein one of the electrical insulation means is rigidly connected to the mounting means.

It is useful that the means for fixing the magnetic systems relative to the pendulous unit comprise a holding bush, an inner cylindrical surface of which contacts with an outer cylindrical surface of each of the electrical insulation means, and a support ring, an outer cylindrical surface of which contacts with an inner cylindrical surface of the holding bush, wherein the electrical insulation means and the pendulous unit would be compressed between a collar, made on the inner cylindrical surface of the holding bush, and the support ring, and two rings secured on the two sides of the support frame coaxially with the coils, each of the rings would encompass a corresponding insulating bush, wherein one of the rings would be mounted on a corresponding bush without a clearance and the second ring would be secured on a corresponding bush with a clearance.

It is also useful that the holding bush and the support ring be made of electrically conducting material, wherein the accelerometer would comprise two insulating plates with metallized surfaces on one side, wherein each insulating plate is secured with the insulating side on the outer face surface of a corresponding core, and the metallized surfaces be electrically connected to the holding bush and the support ring to form an electrostatic screen.

It is advantageous that the tip of the 90° angle between the two flexible members be located on the vane.

It is useful that that the tip of the 90° angle between the two flexible members be located on the support frame.

It is advisable that the accelerometer comprises two additional flexible members, wherein the four flexible members of the flexible suspension form a square.

It is useful that a slot for removing the mechanical stresses in the flexible suspension be made in the support frame, to the right or left of the axis of symmetry of the pendulous unit on the section between the securing of the flexible suspension and the closest protrusions.

It is advantageous that both rings be made of material selected from the group consisting of silicon, quartz, glass, sitall and a material, the coefficient of thermal expansion of which is close to the coefficient of thermal expansion of silicon.

It is also advisable that the coils be secured on the vane by means of two transition washers with a central cylindrical hole, and the pole pieces of the magnetic systems have central cylindrical protrusions facing the pendulous unit and entering the central holes of the transition washers with a clearance, wherein the clearance between the cylindrical surface of one of the protrusions and the cylindrical surface of the central hole of a corresponding transition washer be made much less than the clearance between the coils and the magnetic systems.

It is useful that the transition washers for securing the coils of the torquer be made of insulating material and have contact terminals for connecting the leads of the coils of the torquer.

BRIEF DESCRIPTION OF THE DRAWINGS

Further the invention is elucidated by a description of a concrete embodiment with reference to the accompanying drawings in which.

DETAILED DESCRIPTION OF THE PREFERRED EMBODIMENTS

Figure 1:
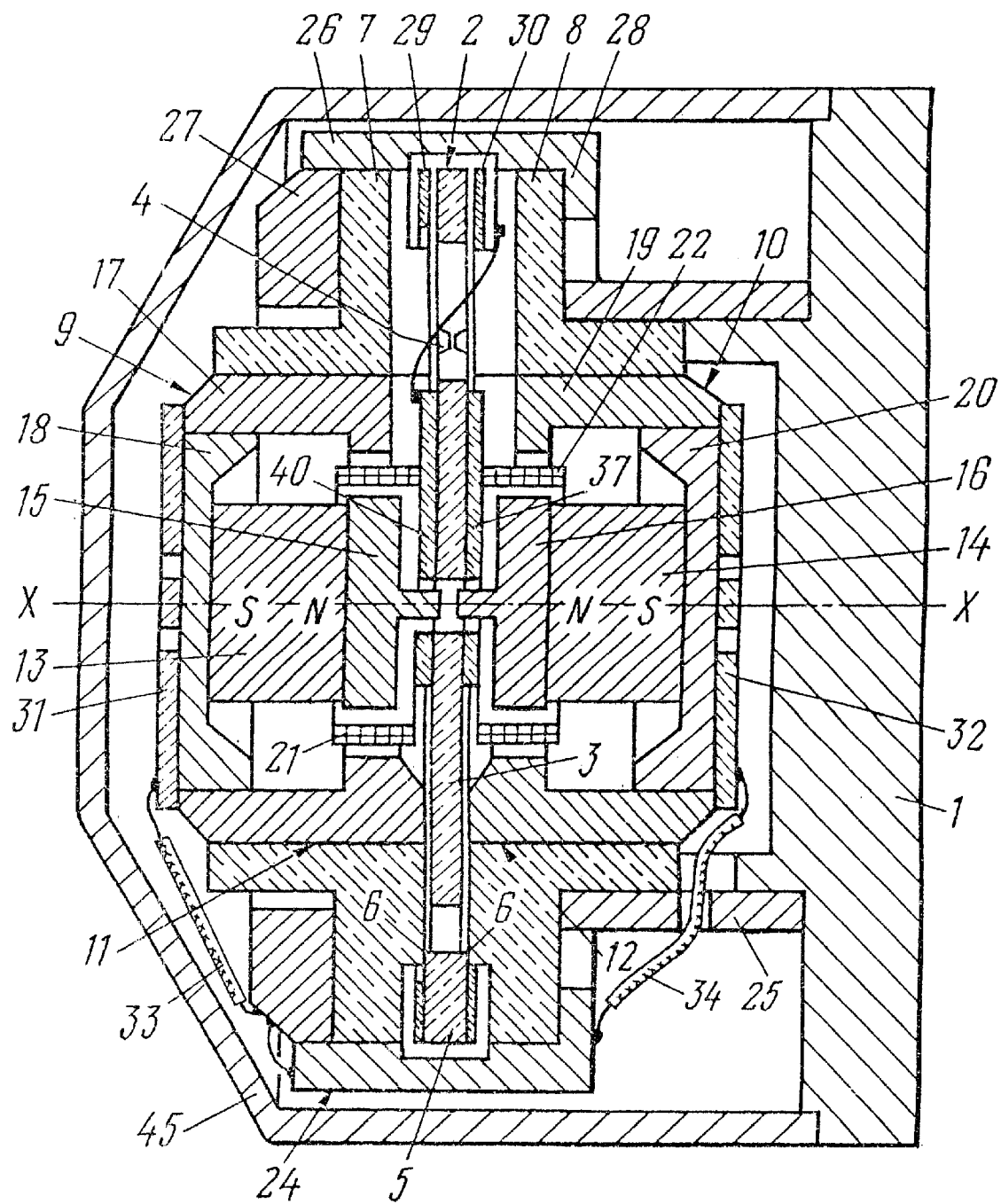
FIG. 1 shows a compensation, pendulous accelerometer (longitudinal section), in accordance with the invention.

The compensation pendulous accelerometer comprises a body 1 (FIG. 1), in which a pendulous unit 2, made of a unitary monocrystal silicon plate, is positioned. The unit 2 comprises a movable vane 3 on a flexible suspension 4 and a support frame 5 with protrusions 6 on both sides of a support frame 5 for positioning.

Two electrical insulation means 7, 8 are secured on the two sides of the support frame 5 on the protrusions 6. The accelerometer meter comprises two magnetic systems 9, 10, each of which includes a core 11, 12, a permanent magnet 13, 14, and a pole piece 15, 16, respectively. Each core 11, 12 consists of two members 17, 18 and 19, 20, respectively. The magnetic system 9 is secured on a corresponding electrical insulation means 7, and the magnetic system 10 is secured on the electrical insulation means 8. The pendulous unit 2 and cores 11, 12 are electrically connected to the input of a servoamplifier of the accelerometer (not shown in FIG. 1).

Two coils 21, 22 of the torquer with leads (not shown) are positioned in clearances of respective cores 9, 10 and are secured on a corresponding side of the movable vane 3.

Figure 2:
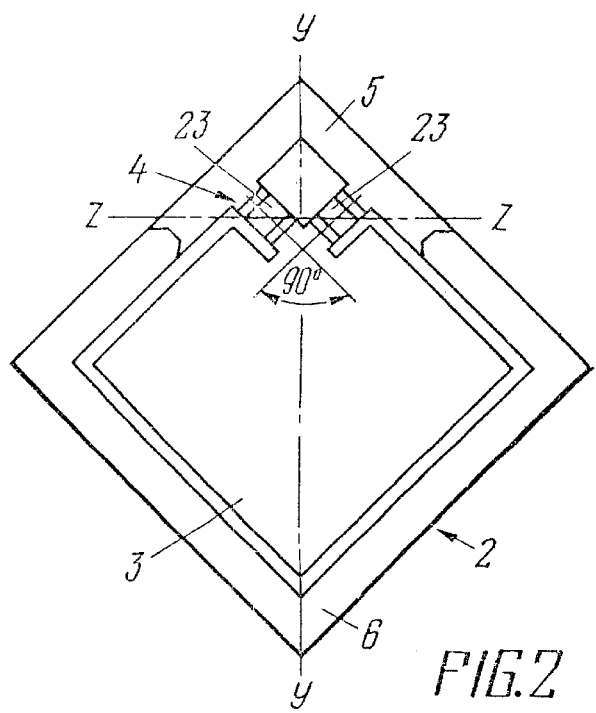
FIG. 2 shows a pendulous unit partial section), in accordance with the invention.

The flexible suspension 4 (FIG. 2) comprises at least two flexible members 23 that are positioned at an angle of 90 degrees relative to one another, symmetrically relative to an axis of symmetry y-y is pendulous unit 2.

Each electrical insulation means 7, 8 (FIG. 1) is made in the form of a bush which encompasses members 17, 19 of the cores 11, 12 of the magnetic systems 9, 10 along the outer side surface. The support frame 5 of the pendulous unit 2 with its protrusions 6, arranged on both sides, abuts against the faces of the bushes, forming common planes with faces of the cores 11, 12 facing the pendulous unit.

The accelerometer additionally comprises a means 24 for fixing the magnetic systems 9, 10 relative to the pendulous unit 2, the means 24 being positioned on the pendulous unit 2 and on each electrical insulation means 7, 8.

The accelerometer also comprises mounting means 25 secured in the body 1 and serving for fixation of the pendulous unit 2 relative to the body 1, wherein the electrical insulation means 8 is rigidly connected to the mounting means 25.

The means 24 (FIG. 3) for fixing the magnetic systems relative to the pendulous unit comprises a holding bush 26, the inner cylindrical surface of which contacts the outer cylindrical surface of each of the electrical insulation means 7, 8, and a support ring 27, the outer cylindrical surface of which contacts with the inner cylindrical surface of the holding bush 26. Wherein, the electrical insulation means 7, 8 and the pendulous unit 2 are compressed between a collar 28, made on the inner cylindrical surface of the holding bush 26, and a support ring 27.

Figure 3:
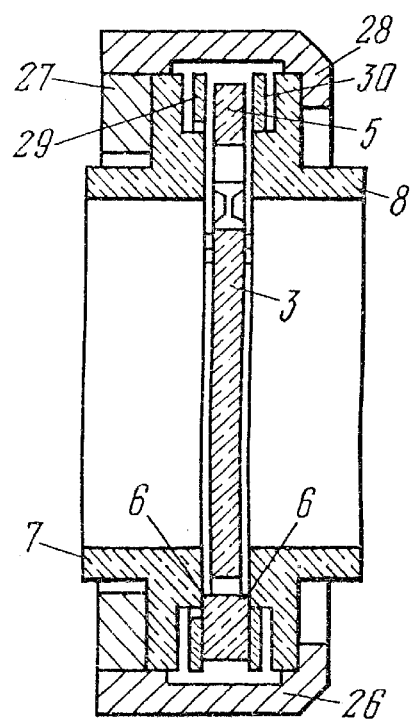
FIG. 3 shows a means for fixing magnetic systems relative to the pendulous unit, in accordance with the invention.
Figure 4:
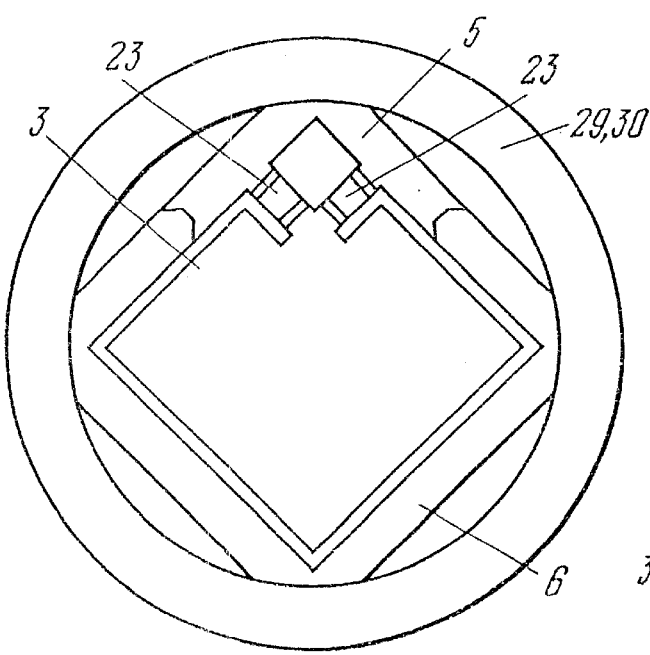
FIG. 4 shows the pendulous unit (partial section), in accordance with the invention.

Two rings 29, 30 are secured on the two sides of the support frame 5 coaxially with the coils 21, 22, respectively (the coils are not shown in FIG. 3). Each of rings 29, 30, encompasses a corresponding insulating bush 7, 8, wherein the ring 30 is mounted on the bush 8 without a clearance, while the ring 29 is secured to a corresponding bush 7 with a clearance. Each of the rings 29, 30 contacts with the protrusions 6 on the support frame 5 (FIG. 4).

The holding bush 26 (FIG. 5) and the support ring 27 are made of an electrically conducting material.

Figure 5:
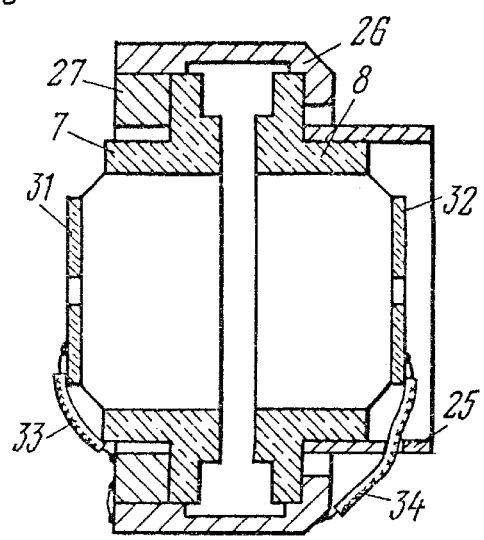
FIG. 5 shows a holding bush and support ring, in accordance with the invention.

The accelerometer also comprises two insulating plates 31, 32, with surfaces metallized on one side, wherein each insulating plate 31, 32, is secured on its insulating side onto the outer face surface of a corresponding core 9, 10 (not shown in FIG. 5). The metallized surfaces are electrically connected by conductors 33, 34 to the holding bush 26 and the support ring 27 to form an electrostatic screen.

Figure 6:
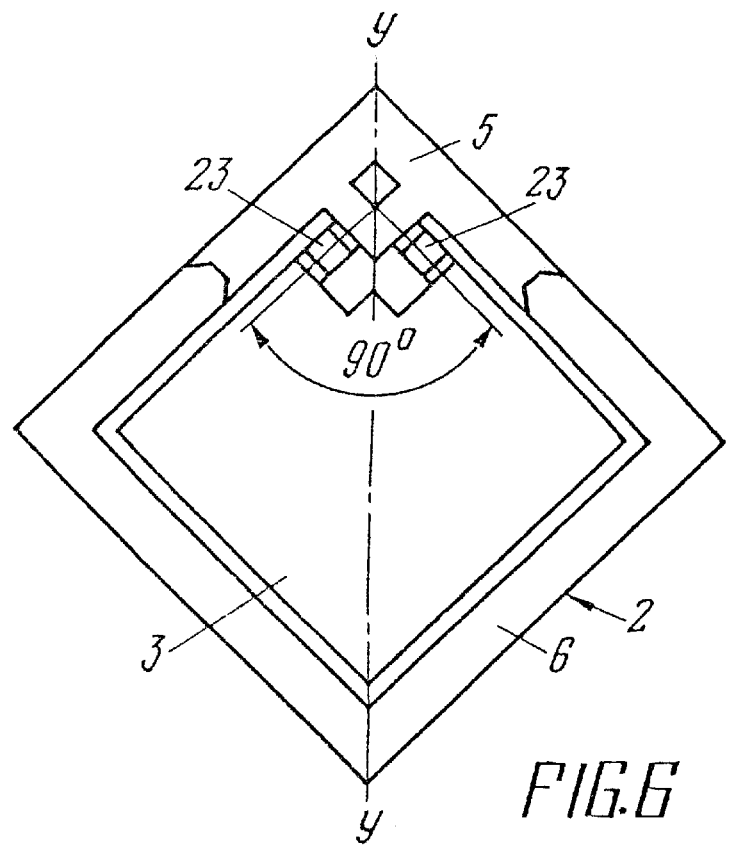
FIG. 6 shows another embodiment of the pendulous unit (partial section), in accordance with the invention.

The tip of the 90° angle (FIG. 2) between the two flexible members 23 is on the vane 3. Another embodiment is possible where the tip of the 90° angle between the two flexible members 23 (FIG. 6) is an the support frame 5.

Figure 7:
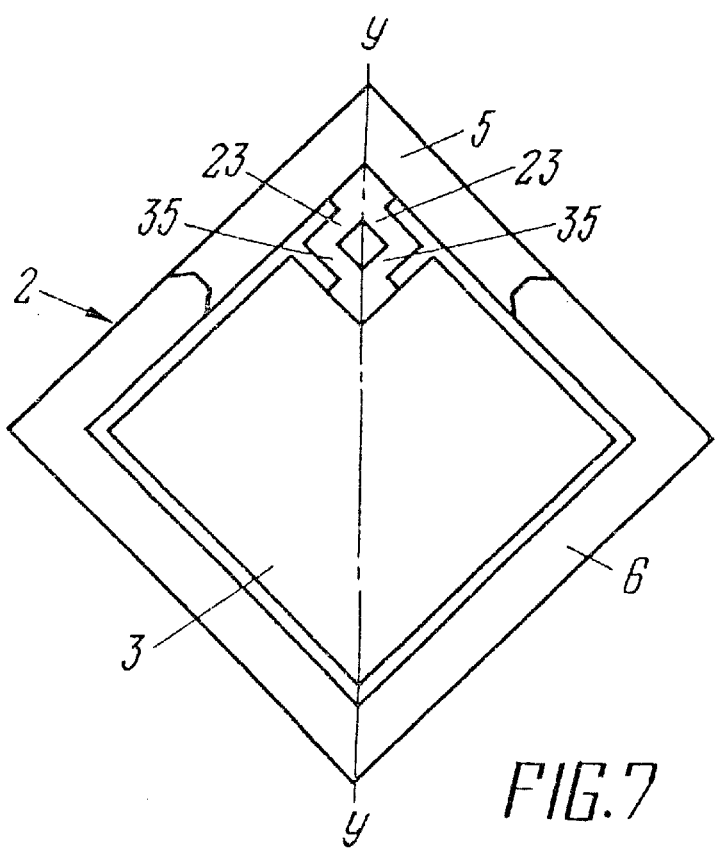
FIG. 7 shows one more embodiment of the pendulous unit (partial section), in accordance with the invention.

One more embodiment is possible where the flexible suspension 4 (FIG. 7) comprises two additional flexible members 35, wherein four flexible members 23, 35 of the flexible suspension 4 form a square.

Figure 8:
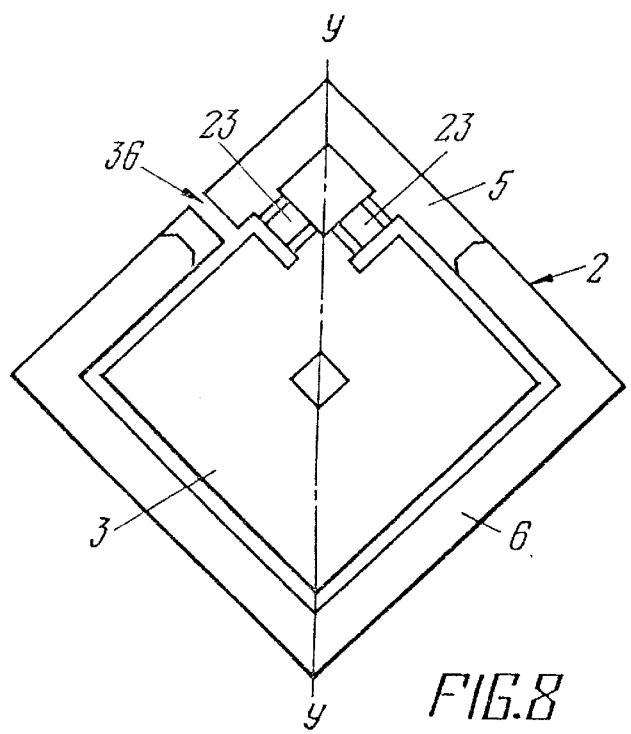
FIG. 8 shows one more embodiment of the pendulous unit (partial section), in accordance with the invention.

A slot 36 for removing the mechanical tensions in the flexible suspension 4 is made in the support frame 5 (FIG. 8) or to the right or to the left of the axis of symmetry y-y of the pendulous unit 2 in the section between the fixation of the flexible suspension 4, having flexible members 23, to the support frame and the nearest protrusion 6. In this embodiment the aforesaid slot 36 is made at the left.

Both rings 20, 30 (FIG. 4) are made of a material selected from the group consisting of silicon, quartz, glass, sitall, and a material, the coefficient of thermal expansion of which is close to the coefficient of thermal expansion of silicon.

Figures 9, 10:
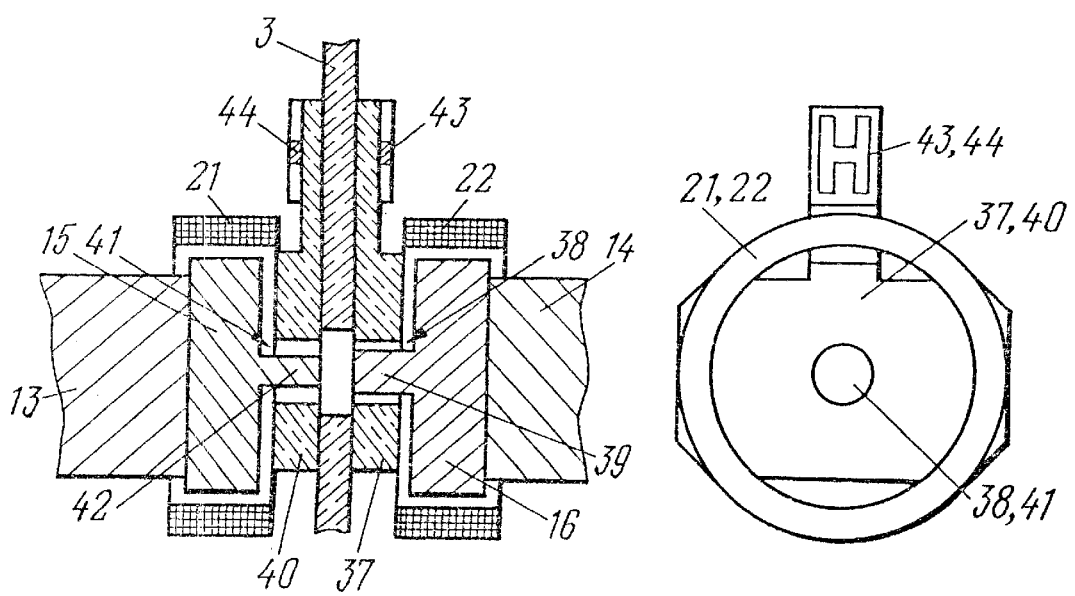
FIG. 9 shows pole pieces of the magnetic system, in accordance with the invention.
FIG. 10 shows a transition bush between the vane of the pendulous unit and a coil of a torquer, in accordance with the invention.

The coil 22 (FIG. 9) is secured to the vane 3 by means of a transition washer 37 with a central cylindrical hole 38. The pole piece 16 of the magnetic system 10 has a central cylindrical protrusion 39 facing the pendulous unit 2 and entering a central hole 38 of the transition washes 37 with a clearance. The coil 21 is secured on the vane 3 by means of a transition washer 40 with a central cylindrical hole 41. The pole piece 15 of the magnetic system 9 has a central cylindrical protrusion 42 facing the pendulous unit 2 and entering the central hole 41 of the transition washer 40 with a clearance.

The clearance between the cylindrical surface of the protrusion 39 and the cylindrical surface of the central hole 38 of the transition washer 37 is made much less than the clearance between the outer cylindrical surface of the coil 22 and the member 19 of the core 12.

The transition washers 37, 40 (FIG. 10) for securing the coils of the torquer are made of an insulating material and have contact terminals 43, 44 for connecting the leads of the a torquer coils.

The coils 21, 22 of the torquer are connected in series and electrically connected to an output of the servoamplifier of the accelerometer.

The accelerometer has a housings 45 (FIG. 1).

The operation of the compensation pendulous accelerometer is carried out in the following manner.

When there is acceleration "a" along the measuring axis x-x (FIG. 1), the sensitive member of the accelerometer, consisting of the movable vane 3 and members of the construction which are secured thereon, is deflected under the action of the moment of inertia mla, wherein: m is the mass of the sensitive member, l is the distance form the center of the mass of tile sensitive member to the axis z-z of the suspension, a is the acceleration along the axis x-x.

The angular displacement of the sensitive member changes the value of the electrical capacitances of the differential capacitance sensor of displacement, where the vane 3 of the pendulous unit is the movable electrode, and the annular surfaces of the insulated metallic cores 11 and 12, lying opposite the vane, are the stationary.

A change in the capacitance of the displacement sensor is transformed by the servoamplifier of the accelerometer into direct current, which is supplied into coils 21 and 22 of the torquer. When current flows through the coils of the torquer, a compensation moment is created that acts on the sensitive member and returns it to the initial position. The DC current flowing through the coils of the torquer is the output signal of the accelerometer.

The proposed compensation pendulous accelerometer has a high accuracy of measurement of the acceleration vector while maintaining or reducing the size and enhancing the vibration resistance.

What is claimed is:

1. A compensation pendulous accelerometer comprising:
   a body;
   a pendulous unit positioned in said body, the pendulous unit being made of a unitary plate of a silicon monocrystal and comprising a movable vane on a flexible suspension and further comprising a support frame with protrusions on two sides of the support frame for positioning the movable vane;
   first and second electrical insulation members each of which is attached to a respective one of said protrusions on the two sides of said support frame;
   a first magnetic system, comprising a first core, a first permanent magnet and a first pole piece;
   a third electrical insulation member, on which said first magnetic system is secured;
   a second magnetic system, comprising a second core, a second permanent magnet and a second pole piece;
   a fourth electrical insulation member, on which said second magnetic system is secured;
   a torquer having a first coil with leads and a second coil with leads;
   the first coil is positioned in a clearance of said first core and secured on one side of said movable vane;
   the second coil is positioned in a clearance of said second core and secured on another side of the movable vane;
   said flexible suspension comprising at least two flexible members arranged at an angle of 90 degrees relative to one another, symmetrically relative to an axis of symmetry of said pendulous unit;
   each of said third and fourth electrical insulation members is made in the form of a bush that encompasses said first and second cores of said first and second magnetic systems along, an outer side surface of said first and second cores;
   said support frame of said pendulous unit having said protrusions positioned on the two sides of the support frame abuts against a respective face of said third and fourth electrical insulation members forming common planes with faces of said cores facing said pendulous unit; and
   means for fixing the magnetic systems relative to said pendulous unit, the means for fixing the magnetic systems relative to said pendulous unit being placed on said pendulous unit and on each of said third and fourth electrical insulation members.

2. An accelerometer according to claim 1, which comprises
   a mounting means secured in said body and serving to fix said pendulous unit relative to said body,
   said first electrical insulation member is rigidly connected to said mounting means.

3. An accelerometer according to claim 1, wherein said means for fixing the magnetic systems relative to the pendulous unit comprises:
   a holding bush, having an inner cylindrical surface which is in contact with an outer cylindrical surface of each of said third and fourth electrical insulation members;

a support ring, having an outer cylindrical surface which is in contact with an inner cylindrical surface of said holding bush;

wherein said third electrical insulation member and said fourth electrical insulation member and said pendulous unit are compressed between a collar, made on the inner cylindrical surface of said holding bush, and said support ring;

a first ring secured on one side of said support frame coaxially with said first and second coils;

a second ring secured on another side of said support frame coaxially with said first and second coils; and each of said first and second rings encompasses a corresponding insulating bush, wherein the first ring is mounted on a corresponding bush without a clearance and the second ring is secured on a corresponding bush with a clearance.

4. An accelerometer according to claim 3, wherein said holding bush and said support ring are made of electrically conducting material, wherein said accelerometer comprises first and second insulating plates with metallized surfaces on one side, said an insulating plate is secured with the insulating side on an outer face surface of a corresponding said core, said second insulating plate is secured with an insulating side on an outer face surface of a corresponding said core, and said metallized surfaces are electrically connected to said holding bush and said support ring to form an electrostatic screen.

5. An accelerometer according to claim 1, wherein a tip of the 90° angle between said two flexible members is located on said vane.

6. An accelerometer according to claim 1, wherein a tip of the 90° angle between said two flexible is located on said support frame.

7. An accelerometer according to claim 1, which further comprises a first additional resilient member and a second additional resilient member, wherein said first and second additional resilient members and said at least two flexible members of said flexible suspension form a square.

8. An accelerometer according to claim 1, wherein a slot for removing mechanical stresses in said flexible suspension is made in said support frame, to the right or left of the axis of symmetry of said pendulous on the section between securing of said flexible suspension and the closest protrusion.

9. An accelerometer according to claim 3, wherein said first and second rings are made of a material having a coefficient of thermal expansion that is substantially the same as a coefficient of thermal expansion of silicon.

10. An accelerometer according to claim 1, wherein said coils are secured on said vane by means of first and second transition washers each heaving central cylindrical hole, wherein said first and second pieces of said first and second systems each having a central cylindrical protrusion facing said pendulous unit and entering said central cylindrical holes of said transition washers with a clearance, the clearance between the cylindrical surface of said protrusion on said first pole piece of said first magnetic system and the cylindrical surface of said central hole of corresponding said transition washer is made much less than the clearance between said coils and said magnetic systems.

11. An accelerometer according to claim 10, wherein said transition washers are made of insulating material and have contact terminals for connecting said leads of the coils of said torquer.

* * * * *